(12) United States Patent
Niwa et al.

(10) Patent No.: US 8,332,118 B2
(45) Date of Patent: Dec. 11, 2012

(54) APPARATUS FOR ARBITRATING PLURALITY OF CONTROL REQUESTS RELATING TO AUTOMATIC CONTROL OF VEHICLE MOTION

(75) Inventors: Satoshi Niwa, Nagoya (JP); Tatsuya Namikiri, Okazaki (JP); Masayoshi Takeda, Kariya (JP); Masatoshi Hanzawa, Kariya (JP)

(73) Assignees: DENSO CORPORATION, Kariya (JP); Advics Co., Ltd., Aichi-pref. (JP)

( * ) Notice: Subject to any disclaimer, the term of this patent is extended or adjusted under 35 U.S.C. 154(b) by 283 days.

(21) Appl. No.: 12/923,317

(22) Filed: Sep. 14, 2010

(65) Prior Publication Data

US 2011/0066344 A1   Mar. 17, 2011

(30) Foreign Application Priority Data

Sep. 16, 2009   (JP) .................... 2009-214722

(51) Int. Cl.
  *G06F 7/00* (2006.01)
(52) U.S. Cl. .......................... 701/70; 701/93
(58) Field of Classification Search ............ 701/70, 701/36, 54, 84, 87, 93; 180/170, 178, 179
  See application file for complete search history.

(56) References Cited

U.S. PATENT DOCUMENTS

| | | | |
|---|---|---|---|
| 6,554,091 B2 * | 4/2003 | Mianzo et al. ............... | 180/197 |
| 2004/0041471 A1 | 3/2004 | Hellmann et al. | |
| 2008/0294301 A1 | 11/2008 | Kaigawa et al. | |
| 2009/0048751 A1 | 2/2009 | Nakai et al. | |

FOREIGN PATENT DOCUMENTS

| | | |
|---|---|---|
| JP | A-2004-528217 | 9/2004 |
| JP | A-2006-506270 | 2/2006 |
| JP | A-2006-297995 | 11/2006 |
| JP | A-2009-040307 | 2/2009 |

* cited by examiner

*Primary Examiner* — Richard M. Camby
(74) *Attorney, Agent, or Firm* — Posz Law Group, PLC

(57) ABSTRACT

A control request arbitration apparatus of a vehicle includes respective sections for selecting one of a plurality of position control requests generated by control request apparatuses, for converting the selected position control request to a converted speed control request, for selecting one of a plurality of speed control requests including the converted speed control request, for converting the selected speed control request to a converted acceleration control request, and for selecting one of a plurality of acceleration control requests including the converted acceleration control request. Since position/acceleration and speed/acceleration conversion sections become unnecessary in control request apparatuses, the total of these sections becomes independent of the number of control request apparatuses.

19 Claims, 7 Drawing Sheets

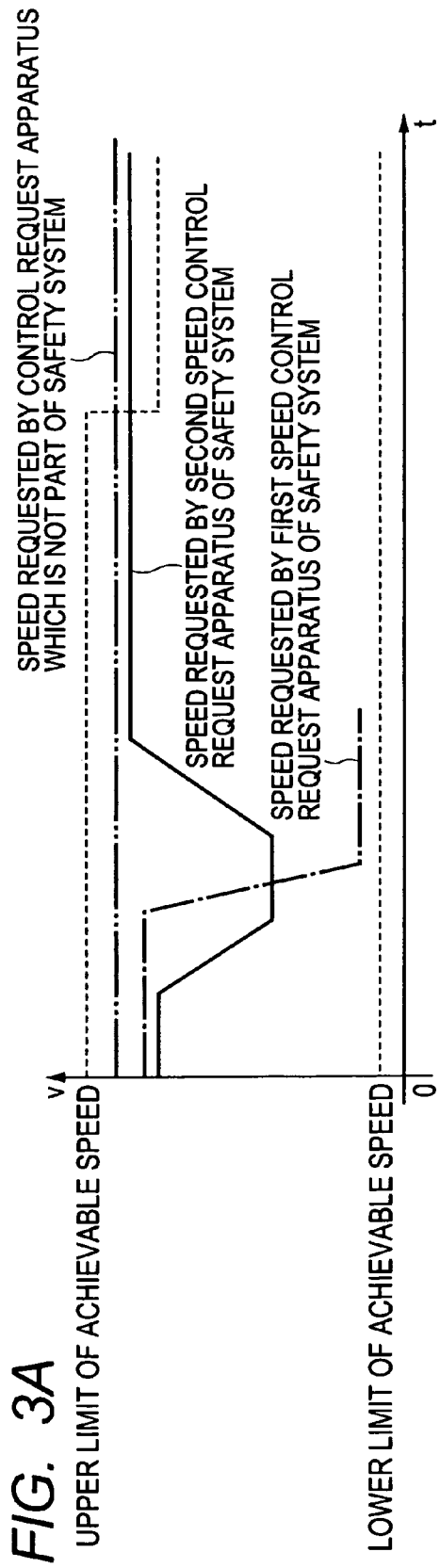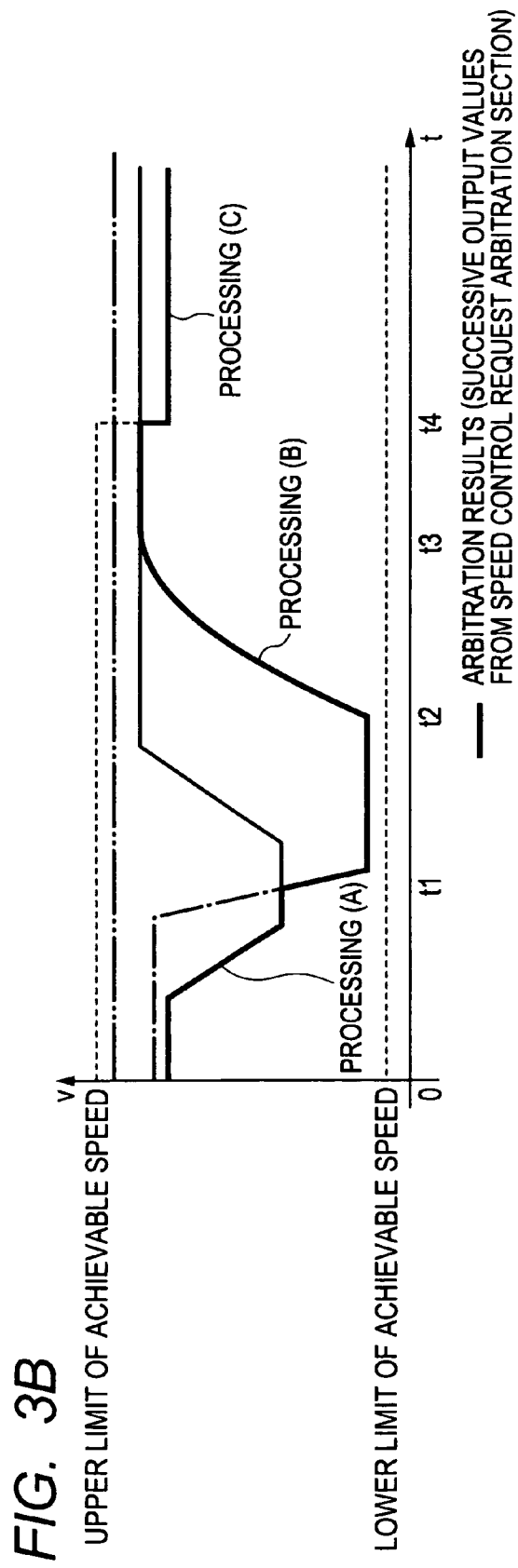

APPARATUS FOR ARBITRATING PLURALITY OF CONTROL REQUESTS RELATING TO AUTOMATIC CONTROL OF VEHICLE MOTION

CROSS-REFERENCE TO RELATED APPLICATIONS

This application is based on and incorporates herein by reference Japanese Patent Application No. 2009-214722 filed on Sep. 16, 2009.

BACKGROUND OF THE INVENTION

1. Field of the Invention

The present invention relates to an apparatus installed in a motor vehicle, for arbitrating a plurality of control requests relating to automatic control of motion of the vehicle, which are generated from respectively different sources.

2. Description of Related Art

A type of vehicle-installed apparatus generally referred to as a VLC (vehicle longitudinal control) apparatus has been proposed, which receives acceleration control requests. Each of these specifies a requested value of acceleration of the vehicle in the longitudinal (i.e., back/front) direction of the vehicle, where the acceleration value may be positive or negative. The VLC apparatus converts such an acceleration control request to a drive control request (e.g., expressing a control value of road wheel axle torque), which is supplied to a drive control apparatus such as an engine ECU (electronic control unit) and to the braking system of the vehicle, for controlling the vehicle to effect the specified change in acceleration. Such a type of VLC apparatus is described for example in Japanese patent laid-open Nos. 2004-528217 and 2006-506270.

A vehicle equipped with such a VLC apparatus may also be equipped with a control request apparatus which (as part of its functions) issues acceleration control requests that are successively inputted to the VLC apparatus. These acceleration control requests may for example be generated to provide driving support, by being applied to automatically control the vehicle to attain an appropriate acceleration value, which is determined based on current conditions of the vehicle and its occupants.

Furthermore a such vehicle may be equipped with a plurality of control request apparatuses which concurrently transmit respective acceleration control requests. In that case it is necessary to provide a control request arbitration apparatus for arbitrating the plurality of control requests, to obtain an acceleration control request that can be supplied to the VLC apparatus.

Japanese patent publication No. 2006-297995 describes such a control request arbitration apparatus, designed to operate as part of a DSS (driving support system).

Such types of control apparatus are not limited to those which control acceleration. Vehicle speed and/or position may also be controlled.

For example an ACC (Adaptive Cruise Control) apparatus automatically controls the vehicle position, or distance from a preceding vehicle (control of position). A CC (Cruise Control) apparatus automatically maintains a desired speed (control of speed), an ASL (Automatic Speed Limitation) apparatus limits the vehicle speed (control of speed). A CA (Collision Avoidance) apparatus, as part of a safety system of the vehicle, can automatically control acceleration when necessary to avoid or mitigate a collision.

The physical quantities relating to longitudinal displacement of a vehicle are position, speed, acceleration, rate of change of acceleration (i.e., "jerk"), and torque (applied to axles of road wheels of the vehicle, for attaining a required acceleration).

Non-acceleration control requests (i.e., position or speed control requests) must be converted to corresponding acceleration control requests. Thus in the prior art, when there are a plurality of non-acceleration control request apparatuses, it has been necessary for each of these to include a control request conversion section. All of the resultant acceleration control requests from the various control request apparatuses are arbitrated by an acceleration control request arbitration section, e.g., by selecting one of these inputted control requests. Acceleration control is performed in accordance with the selected acceleration control request.

Thus, it has been necessary to provide a number of control request conversion sections equal to the total number of non-acceleration control request apparatuses. Here, "control request conversion section" signifies a module of a computer program, or a dedicated hardware circuit, which performs conversion from position values to acceleration values or from speed values to acceleration values.

For increased efficiency of design, it would be desirable to reduce the necessary number of these control request conversion sections.

SUMMARY OF THE INVENTION

It is an objective of the present invention to enable such increased efficiency of design, by providing a control request arbitration apparatus for use in a vehicle, which arbitrates respective pluralities of position control requests (expressing requested values of position of the vehicle), speed control requests (expressing requested values of speed of the vehicle) and acceleration control requests (expressing requested values of acceleration of the vehicle) that are variously generated by a plurality of control request apparatuses of the vehicle.

The control request apparatus derives from these a single acceleration request, which is converted to a motion control request, e.g., a torque control request expressing a requested value of wheel axle torque. This is supplied to an acceleration control apparatus of the vehicle (e.g., combination of drive control apparatus and braking control apparatus).

A control request arbitration apparatus according to the present invention is characterized in that it is not necessary to provide respectively separate conversion sections (for converting position values to acceleration values, or converting speed values to acceleration values) in each of respective non-acceleration control request apparatuses (i.e., speed control request apparatuses and position control request apparatuses) as has been necessary in the prior art.

Such a control request arbitration apparatus includes a position control request arbitration section, position control request conversion section, speed control request arbitration section, speed control request conversion section, acceleration control request arbitration section and acceleration control request conversion section. The functions of these respective sections of the apparatus are preferably implemented through execution of a computer program, or a plurality of computer programs.

The position control request arbitration section selects one out of a plurality of inputted position control requests, with the selection performed in accordance with predetermined criteria (i.e., predetermined arbitration policy).

The position control request conversion section converts the selected position control request to a first converted control request. This expresses a requested control value having a dimension (speed or of acceleration) that is determined in accordance with its destination. That is to say, if the first converted control request is to be inputted directly to an acceleration control request arbitration circuit, it is converted to an acceleration control request, while if it is to be inputted to a speed control request arbitration circuit, it is converted to a speed control request. The term "dimension" is used herein to categorize types of control request, i.e., with position control requests, speed control requests, acceleration control requests and torque control requests respectively belonging to the position, speed, acceleration and torque dimensions.

The speed control request arbitration section obtains (e.g., selects) a single speed control request from a plurality of speed control requests, while the speed control request conversion section converts the obtained speed control request to a second converted control request. Depending upon its destination, this second converted control request is determined as being either a position control request or an acceleration control request.

The acceleration control request arbitration section receives a plurality of acceleration control requests (including converted acceleration control requests as described above) and derives a single acceleration control request from these. The acceleration control request conversion section converts that acceleration control request to a corresponding motion control request (e.g., specifying a required value of wheel axle torque), which is supplied to the acceleration control apparatus.

An acceleration control apparatus used with such a control request arbitration apparatus may produce achievable motion control range information, e.g., expressing the range of values of road wheel torque that can currently be applied by the acceleration control apparatus. The control request arbitration apparatus preferably includes a section for converting that torque range information to a corresponding range of acceleration that can currently be achieved. The achievable acceleration range information can be applied to limit a selected acceleration value. In addition, the achievable acceleration range information may be converted to corresponding achievable speed range information, which can be used to limit the value of speed expressed by a selected speed control request. Similarly, the achievable speed range information can be converted to achievable position range information, which can be used to limit the requested value of speed expressed by a selected speed control request.

It can thereby be ensured that the acceleration control apparatus is not requested to achieve a control value (e.g., wheel axle torque value) that is not within currently achievable limits.

More specifically, the control request arbitration apparatus and acceleration control apparatus are preferably configured such that the acceleration control apparatus generates updated achievable wheel torque range information at each of successive control timings, and this is converted to achievable acceleration range information by the control request arbitration apparatus. The achievable information expresses the maximum and minimum values of acceleration that can be applied during the period (control period) extending to the next control timing, if the current maximum and minimum achievable values of wheel torque are applied during that period. Similarly, the achievable speed range information (maximum and minimum speed values) expresses the current speed respectively incremented by the maximum and minimum amounts of speed increase which can be achieved during the succeeding control period (with the maximum and minimum achievable acceleration values respectively applied during that period).

Similarly, the achievable position range information (maximum and minimum position values) expresses the current position of the vehicle respectively shifted by the maximum and minimum amounts of position displacement which can be achieved during the succeeding control period (with the maximum and minimum achievable speed values respectively applied during that period).

It would be possible to allow a requested value of acceleration to exceed the achievable range of control by the acceleration control apparatus, i.e., at a current timing, when an updated torque control request is transmitted to the acceleration control apparatus, and to then detect the out-of-range amount at the next control timing, and apply compensation accordingly at that time. However by applying limiting based on currently achievable control range information as described above, improved control response speed can be attained.

From another aspect, each of the position control request arbitration section, speed control request arbitration section and acceleration control request arbitration section may be configured to distinguish a control request having a predetermined character, and to perform the arbitration by assigning a high priority to such a control request.

This preferably applies to a request generated by a control request apparatus having a vehicle safety function, e.g., which is part of a collision avoidance system. In general, such a control request has the objective of rapidly bringing the vehicle towards a halted condition. Preferably the apparatus is configured such that, for example when there are a plurality of speed control requests concurrently generated by respective control request apparatuses having a vehicle safety function, the speed control request which will enable the vehicle to be brought most quickly to the halted condition (i.e., which specifies the lowest value of requested speed) is selected.

From another aspect, each of the position control request arbitration section, the speed control request arbitration section and the acceleration control request arbitration section is preferably configured to detect a condition whereby a difference between a currently requested control value (expressed by a currently selected control request) and a requested control value expressed by a precedingly derived selected control request exceeds a predetermined amount, and to initiate predetermined smoothing processing when the condition is detected. The smoothing processing is applied for adjusting respective control values expressed by successively selected control requests. In that way, sudden large fluctuations in the requested motion control values (e.g., requested wheel axle torque values) can be avoided.

BRIEF DESCRIPTION OF THE DRAWINGS

FIGS. 3A and 3B are timing diagrams illustrating examples of time-axis variation of values of requested speed, of achievable speed range, and of resultant selected speed values, for describing the operation of the embodiment;

DESCRIPTION OF PREFERRED EMBODIMENTS

Figure 1:
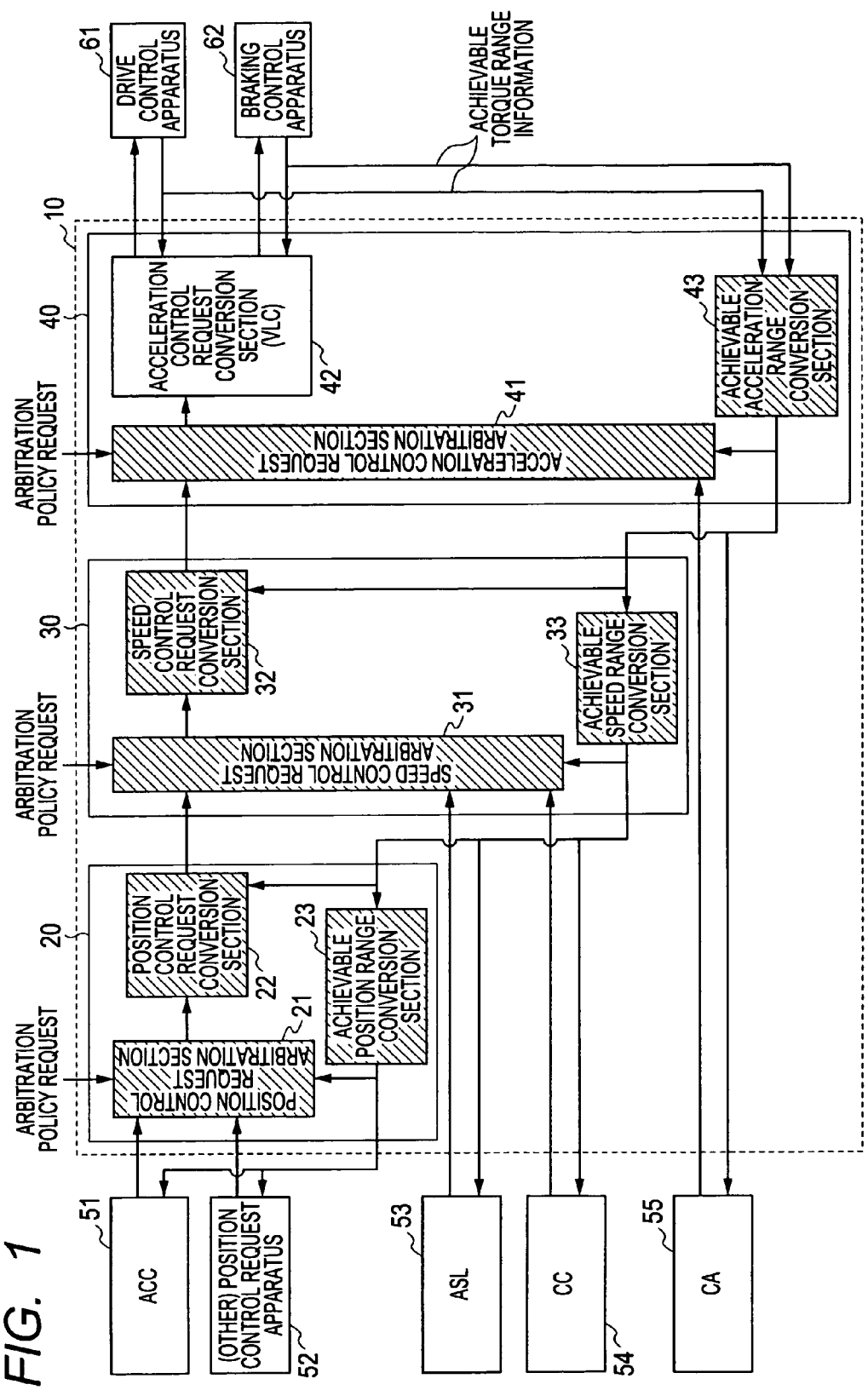
FIG. 1 is a block diagram showing the overall configuration of a preferred embodiment of a control platform.

An embodiment of a control platform, functioning as a control request arbitration apparatus, will be described in the following referring to the drawings.

Overall Configuration

FIG. 1 is a block diagram showing the general configuration of the embodiment, designated by reference numeral 10, which is installed in a vehicle equipped with a plurality of control request apparatuses. Of these, position control requests are generated by an ACC (Adaptive Cruise Control apparatus) 51 and by at least one other position control request apparatus 52. Speed control requests are generated by an ASL (Automatic Speed Limiting) apparatus 53 and a CC (Cruise Control) apparatus 54. Acceleration control requests are generated by a CA (Collision Avoidance) apparatus 55.

Respective control requests outputted from the control request apparatuses 51 to 55 are inputted to the vehicle motion control platform 10, to obtain a single acceleration control request. This can express a positive or negative (i.e., deceleration) requested value of acceleration, and is converted to a torque control request by an acceleration control request conversion section 42 as described hereinafter. The torque control request expresses a requested value of torque (specifically, value of drive torque or braking torque that is to be applied to wheel axles of the vehicle), and is inputted to a drive control apparatus 61 which controls motive power for driving the vehicle and to a braking control apparatus 62 of the vehicle. The requested torque value expressed by a torque control request corresponds to a value of an acceleration control quantity, as recited in the appended claims.

The control request apparatuses 51 and 52 serve for automatic position control of the vehicle, the ASL apparatus 53 and the CC apparatus 54 serve for automatic control speed control, and the CA apparatus 55 serves for automatic control of acceleration to avoid a collision, or lessen the impact of a collision.

Each acceleration control request produced by the CA apparatus 55 expresses a requested value of acceleration and maximum and minimum allowable jerk values (where "jerk" is the rate of change of acceleration with time).

Each speed control request outputted by the ASL apparatus 53 or the CC apparatus 54 expresses a requested value of speed at which the vehicle is to run, and also expresses maximum and minimum allowable acceleration values (allowable acceleration range information), where the acceleration values may be positive or negative (i.e., deceleration) values.

Each position control request outputted from the ACC apparatus 51 or other position control request apparatus 52 expresses a requested position of the vehicle, and also maximum and minimum allowable vehicle speed values (allowable speed range information.

As shown in FIG. 1, the vehicle motion control platform 10 is formed of a position control platform 20, a speed control platform 30 and an acceleration control platform 40. The position control platform 20 is formed of a position control request arbitration section 21, a position control request conversion section 22 and an achievable position range conversion section 23. The position control request arbitration section 21 is configured to receive a plurality of position control requests, produced from the ACC apparatus 51 and other position control request apparatus, and performs arbitration by selecting one of these position control requests in accordance with an arbitration policy, i.e., specific selection criteria.

The requested position value expressed by the selected position control request is then limited, to be within a range between maximum and minimum achievable position values. These values are supplied from the achievable position range conversion section 23 as described hereinafter. The resultant limited requested position value is inputted to the position control request conversion section 22.

With this embodiment, the policy specified by an arbitration policy request may be adjusted in accordance with external and internal conditions of the vehicle and its occupants. Since the processing for generating the arbitration policy requests does not relate to the novel features of the invention, description is omitted. However the invention is not limited to this, and it would be equally possible for the respective arbitration policies of the position control platform 20, the speed control platform 30 and the acceleration control platform 40 to be fixedly predetermined.

The overall arbitration policy is as follows. Each of the control request arbitration sections is configured to recognize an inputted control request that is generated by a safety system apparatus, such as the CA apparatus 55. If a plurality of control requests are to be selected, and none of these originate from a safety system apparatus, then arbitration is performed by selecting the control request whose objective can be most rapidly accomplished. If there are a plurality of (non-safety system) speed control requests, the request which specifies the highest absolute value of speed is selected. If there are a plurality of position control requests, the control request specifying the smallest change from the current position of the vehicle is selected. If there are a plurality of (non-safety system) acceleration control requests, the control request which specifies the highest acceleration value is selected.

If there is a control request from a single safety system apparatus, arbitration is performed by selecting that control request. If there are a plurality of control requests each originating from a safety system apparatus, then the one of these control requests which will tend to bring the vehicle most rapidly to a halted condition is selected.

For example in the case of a plurality of speed control requests generated from respective safety system control request apparatuses, the control request specifying the lowest absolute value of speed is selected. In the case of a plurality of position control requests from respective safety system control request apparatuses, the request specifying the smallest change in vehicle position (from the current position) is selected. In the case of a plurality of acceleration control requests from respective safety system control request apparatuses, the request which specifies the lowest positive acceleration (or highest negative acceleration) is selected.

At each of successive control timings, separated by control periods, the drive control apparatus 61 and braking control apparatus 62 generate achievable torque range information (maximum and minimum achievable values of wheel axle torque which can be applied during the succeeding control period). Each torque value may be a positive or a negative value.

The achievable torque range information is inputted to the achievable acceleration range conversion section 43, for obtaining corresponding achievable acceleration range information (maximum and minimum achievable acceleration values that can be maintained during the succeeding control period) as described hereinafter. The achievable acceleration range information is inputted to the achievable speed range conversion section 33 of the speed control platform 30, for obtaining corresponding achievable speed range information (maximum and minimum achievable vehicle speed values that can be reached in the succeeding control period). The achievable speed range information is inputted to the achievable position range conversion section 23 of the position control platform 20, for obtaining corresponding achievable position range information (maximum and minimum achievable vehicle positions than can be attained in the succeeding control period).

At each control timing, the position control request conversion section 22 converts the currently selected position control request to a speed control request, by FF (feed-forward) control and FB (feedback) control. The control is executed based on the difference between the requested position (expressed by the selected position control request) and the actual vehicle position. The requested speed value thus obtained is limited to be within the range of allowable speed values (expressed by the selected position control request) and to be within the range of achievable speed values. In addition, maximum and minimum acceleration values are derived, based on the requested speed value that is obtained.

The resultant speed control request (requested speed value, and maximum and minimum allowable acceleration values) is inputted to the speed control request arbitration section 31 of the speed control platform 30.

The configuration and operation of the position control request conversion section 22 are similar to those of a speed control request conversion section 32 of the speed control platform 30, is described hereinafter referring to FIG. 4.

The achievable position range conversion section 23 converts the aforementioned achievable speed range (outputted from the achievable speed range conversion section 33) to an achievable position range, by calculating maximum and minimum position values based upon the achievable speed range, and the current position of the vehicle, detected by a position sensor (not shown in the drawings). The maximum and minimum achievable position values are inputted to the position control request arbitration section 21 and to each of the ACC apparatus 51 and the other position control request apparatus 52.

The speed control platform 30 is formed of a speed control request arbitration section 31, a speed control request conversion section 32 and an achievable speed range conversion section 33. The speed control request arbitration section 31 receives a plurality of speed control requests, supplied from the position control platform 20, the ASL apparatus 53 and the CC apparatus 54, and selects one of these in accordance with the arbitration policy (specified by an arbitration policy request that is inputted to the speed control request arbitration section 31) described hereinabove.

At each control timing, the speed control request conversion section 32 converts the selected speed control request to an acceleration control request. This is done by feedback control and feed-forward control based upon the difference between the requested speed (expressed by the currently selected speed control request) and the actual current speed of the vehicle, supplied by a speed sensor (not shown in the drawings). A requested acceleration value is thereby obtained, which is limited if necessary to be within the achievable acceleration range. The speed control request conversion section 32 also derives maximum and minimum allowable values of jerk, corresponding to the requested acceleration value.

The speed control request conversion section 32 thereby produces an acceleration control request (requested acceleration value, and maximum and minimum allowable jerk values), which is inputted to the acceleration control request arbitration section 41 of the acceleration control platform 40.

The achievable speed range conversion section 33 converts the achievable acceleration range to a corresponding achievable speed range. This is done by calculation based upon the maximum and minimum values of achievable acceleration that, supplied from the achievable acceleration range conversion section 43, and upon the current vehicle speed (detected by a speed sensor, not shown in the drawings). The resultant achievable speed range information (maximum and minimum achievable speed values) is supplied by the achievable speed range conversion section 33 to the speed control request arbitration section 31, the achievable position range conversion section 23 and each of the ASL apparatus 53 and CC apparatus 54.

The acceleration control platform 40 is formed of an acceleration control request arbitration section 41, an acceleration control request conversion section 42 and the achievable acceleration range conversion section 43. The acceleration control request arbitration section 41 receives a selected acceleration control request from the speed control platform 30 and an acceleration control request from the CA apparatus 55, and selects one of these in accordance with the above-described arbitration policy. The requested acceleration value expressed by the selected acceleration control request is limited by the acceleration control request arbitration section 41 to be within the maximum and minimum achievable acceleration values. The resultant requested acceleration value is inputted to the acceleration control request conversion section 42.

In addition to these inputs, the acceleration control request conversion section 42 receives the achievable torque range information which is outputted (updated) by the drive control apparatus 61 and braking control apparatus 62 at each control timing. Based on the inputted information, the acceleration control request conversion section 42 converts the requested acceleration value to a requested torque value, by feedback control and feed-forward control.

Specifically, depending upon the operating conditions of the drive control apparatus 61 and the braking control apparatus 62 and upon whether a positive or negative requested acceleration value is expressed by the acceleration control request selected by the acceleration control request arbitration section 41, the acceleration control request conversion section 42 converts the selected acceleration control request to an axle drive torque request which is supplied to the drive control apparatus 61, or to an axle braking torque request which is supplied to the braking control apparatus 62.

The requested value of torque (drive torque or braking torque) is limited by the acceleration control request conversion section 42 to be within the currently achievable torque range, and such that the corresponding value of jerk will be within the minimum and maximum allowable values of jerk (expressed by the selected acceleration control request).

At each control timing, the achievable acceleration range conversion section 43 calculates (updates) achievable acceleration range information (maximum and minimum currently achievable acceleration values). This is done based on achievable torque range information, i.e., maximum and minimum currently achievable values of drive torque, produced by the drive control apparatus 61, and maximum currently achievable value of braking torque produced by the braking control apparatus 62.

This calculation is performed by the acceleration range conversion section 43 based upon the drive torque range and braking torque range information, vehicle operating characteristics information (stored beforehand), and upon the actual acceleration of the vehicle at the current time, as detected by an acceleration sensor (not shown in the drawings).

The achievable acceleration range information thus obtained is supplied to the acceleration control request arbitration section 41, and also to the speed control request conversion section 32, the achievable speed range conversion section 33, and the CA apparatus 55.

Operations performed by the control request arbitration apparatus of FIG. 1, initiated at each control timing, can be summarized as follows, assuming that each of the control request apparatuses 51 to 54 are currently generating respective control requests. Firstly the achievable acceleration range conversion section 43 calculates updated achievable acceleration range information, in response to the (currently produced) achievable drive torque and braking torque information. This achievable acceleration range information is supplied to the acceleration control request arbitration section 41, to the speed control request conversion section 32, the achievable speed range conversion section 33, and to the CA apparatus 55. The CA apparatus 55 then updates its acceleration control request, in accordance with the achievable acceleration range information.

The achievable speed range conversion section 33 then calculates updated achievable speed range information, which is supplied to the speed control request arbitration section 31, to the position control request conversion section 22 and achievable position range conversion section 23, and to the speed control request apparatuses 53, 54. Each of the ASL apparatus 53 and CC apparatus 54 then updates its speed control request in accordance with the achievable speed range information.

The achievable position range conversion section 23 then calculates updated achievable position information, which is supplied to the position control request arbitration section 21 and to each of the control request apparatuses 51 and 52. Each of the ACC apparatus 51 and the other position control request apparatus 52 then updates its position control request, in accordance with the achievable position range information.

With this embodiment, the achievable acceleration range information is calculated as follows, where "MAX(A, B)" signifies the larger one of the values A and B:

minimum achievable acceleration≦achievable
acceleration≦range maximum achievable acceleration minimum achievable acceleration=−MAX(maximum
achievable braking torque,|minimum achievable
drive torque|)/(vehicle weight×road wheel
radius)

maximum achievable acceleration=maximum achievable drive torque/(vehicle weight×road wheel
radius)

The achievable speed range information is calculated as follows:

minimum achievable speed≦achievable speed
range≦maximum achievable speed minimum achievable speed=current speed+(minimum
achievable acceleration×control period)

maximum achievable speed=current speed+(maximum achievable acceleration×control period)

The achievable position range information is calculated as follows:

minimum achievable position≦achievable position
range≦maximum achievable position minimum achievable position=current position+(minimum achievable speed×control period)

maximum achievable position=current position+
(maximum achievable speed×control period)

With this embodiment, the functions of the vehicle motion control platform 10 are implemented by an ECU (electronic control unit) which is based on a microcomputer (not shown in the drawings) installed in the vehicle, i.e., the position control platform 20, the speed control platform 30 and the acceleration control platform 40 are respectively implemented as modules of a program or programs executed by the microcomputer. However the position control platform 20, speed control platform 30 and acceleration control platform 40 are not limited to any specific software or hardware configuration. For example it would be possible to implement these through execution of a program by a single dedicated ECU, or through execution of programs by a plurality of ECUs.

Furthermore with this embodiment, each of the control request apparatuses 51 to 55 perform functions relating to the present invention by executing one or more programs (applications) by a microcomputer. However these apparatuses are not limited to any specific software or hardware configurations.

Internal Operation of Control Request Arbitration Section

The internal configuration and operation of the speed control request arbitration section 31 of the speed control platform 30 will be described in the following. Since the internal configuration and operation of the position control request arbitration section 21 and the acceleration control request arbitration section 41 are similar to those of the speed control request arbitration section 31, specific description of these is omitted.

Figure 2:
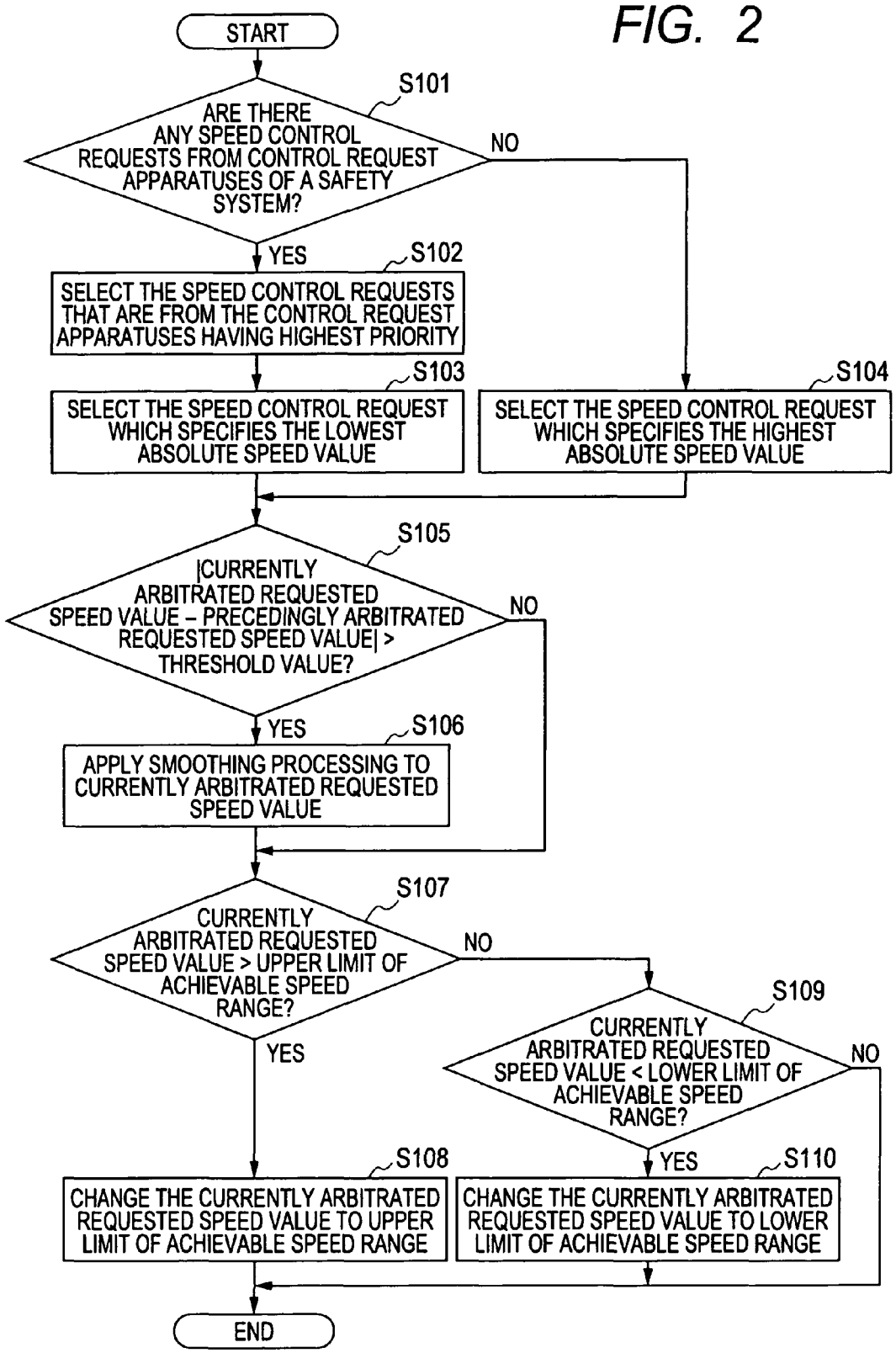
FIG. 2 is a flow diagram of a processing routine that is executed by the embodiment.

FIG. 2 is a flow diagram of a processing routine executed by the speed control request arbitration section 31 at each control timing, when it is necessary to arbitrate a plurality of speed control requests respectively inputted from the position control platform 20, the ASL apparatus 53 and the CC apparatus 54.

Firstly (step S101) a decision is made as to whether the plurality of inputted speed control requests include at least one speed control request from a safety system of the vehicle. Discrimination between a speed control request from a safety system and speed control requests from other apparatuses is performed based on the character of the originating control request apparatus, with the respective characters of the control request apparatuses having been determined beforehand. Here, "character" of a control request apparatus signifies the effect which speed control requests issued by the control request apparatus have upon preserving the safety of the vehicle.

With this embodiment, each control request apparatus can be assigned only a high priority (control request apparatuses of a safety system) or a low priority (any other control request apparatuses). However the invention is not limited to this, and it would be equally possible to use three or more levels.

If it is judged in step S101 that the plurality of inputted speed control requests include one or more speed control request from control request apparatuses of safety system, these highest-priority speed control requests are selected (step S102).

Following step S102, the one of these highest-priority speed control requests which specifies the smallest absolute value of speed is selected (step S103). The speed control request which will bring the vehicle closest to a stationary condition is thereby selected. Step S105 is then executed.

However if it is found in step S101 that there is no speed control request from a control request apparatus of a safety system, then (S104) the speed control request which specifies the highest absolute speed value is selected. Step S105 is then executed.

The difference between the absolute value of the currently selected requested speed (specified by the acceleration control request that was selected in step S103 or S104) and the absolute value of the requested speed which was selected at the preceding control timing is then calculated. A decision is then made as to whether the difference exceeds a predetermined threshold value (step S105).

If the threshold value is exceeded, step S106 is executed, while otherwise step S107 is executed. In step S106 a form of filter processing (smoothing processing) is initiated for reducing abrupt changes in the successively selected requested speed values.

In step S107, a decision is made as to whether the selected requested speed value (with smoothing processing having been applied in step S106 if necessary) exceeds the upper limit of the currently achievable speed range.

If the upper limit of achievable speed is judged to be exceeded then (step S108) that upper limit of the achievable speed range is set as the requested speed value which is supplied to the speed control request conversion section 32. This execution of the processing routine is then ended. The requested speed is thereby limited such as to not exceed the achievable upper limit value.

However if it is judged in step S107 that the selected speed value does not exceed the upper limit of the achievable speed range, then (S109) a decision is made as to whether the selected speed value (with smoothing processing having been applied in step S106 if necessary) is below the lower limit of the achievable speed range.

If the selected speed value is judged to be less than that lower limit, then (step S110) the lower limit value is set as the requested speed value which is inputted to the speed control request conversion section 32. This execution of the processing routine is then ended.

It is thereby ensured that the requested speed value that is inputted to the speed control request conversion section 32 cannot be less than the lower limit of the achievable speed range.

However if it is judged in step S109 that the selected speed value is not less than the lower limit of the achievable speed range, then this execution of the processing routine is ended directly. In that case, the speed value that has been selected in step S103 or step S104 (with smoothing processing having been applied in step S106 if necessary) is inputted to the speed control request conversion section 32 as the requested speed value.

FIG. 3A is a timing diagram showing an example of time-axis variation of requested speed values and of the achievable speed range. FIG. 3B shows the result of arbitration processing performed by the speed control request arbitration section 31 as described above, on the successive requested speed values shown in FIG. 3A. In FIG. 3A, the thin full-line portions and single-dot chain line portions respectively show time-axis variation of requested speed values from two different control request apparatuses of the safety system. The double-dot chain line portion illustrates the variation of requested speed values from a control request apparatus other than those of the safety system. The two (non-dotted) broken-line portions illustrate time-axis variation of the upper limit value and of the lower limit value of the achievable speed range, respectively.

In this example, a speed control request which is being issued by one of the control request apparatuses of the safety system is terminated at a time point indicated as t2.

In FIG. 3B, the thick-line portion shows time-axis variation of the selected speed values that are outputted from the speed control request arbitration section 31, in response to the requested speed values shown in FIG. 3A. FIG. 3B shows the following features, designated as feature (A), feature (B) and feature (C):

Feature (A): If there are a plurality of requested speed values from control request apparatus of the safety system, the requested speed that is from the highest-priority one of these control request apparatuses, and which specifies the lowest absolute value of requested speed, is selected. Hence FIGS. 3A, 3B, initially the requested speeds specified by the "first control request apparatus" of the safety system are selected. Following time point t1, the requested speeds specified by the "second control request apparatus" of the safety system become the lowest absolute value, and so become selected.

Feature (B): If the absolute difference between the currently selected requested speed and the requested speed which was selected at the preceding control timing is greater than the threshold value, then smoothing processing of selected speed values is initiated. In the example of FIGS. 3A, 3B, the requested speed values specified by the "first control request apparatus" of the safety system end at the time point t2. Hence the requested speed values specified by the "second control request apparatus" of the safety system are selected thereafter.

Thus at time t2, the absolute difference between the newly selected speed and the value selected at the preceding control timing is judged to be greater than the threshold value. Hence, smoothing processing of the subsequent selected requested speed values is initiated at time t2. As a result, the selected speed values gradually increase to the value specified by the "second control request apparatus" of the safety system (reached at time point t3).

Feature (C): If the selected (selected) speed is not within the achievable speed range, limiting processing is executed to contain the selected requested speed values within the achievable speed range. In the example of FIGS. 3A, 3B, the upper limit of the achievable speed range is reduced at time point t4. As a result, the currently selected requested speed becomes higher than the upper limit. Hence, following time point t4, the selected speed values are limited such as to not exceed that upper limit.

Internal Operation of Control Request Conversion Section

The internal operation of the speed control request conversion section 32 of the speed control platform 30 will be described referring to the block diagram of FIG. 4. Only the operation of the speed control request conversion section 32 will be described in detail, Since the operation of the position control request conversion section 22 is similar to that of the speed control request conversion section 32, only the operation of the latter will be described.

Figure 4:
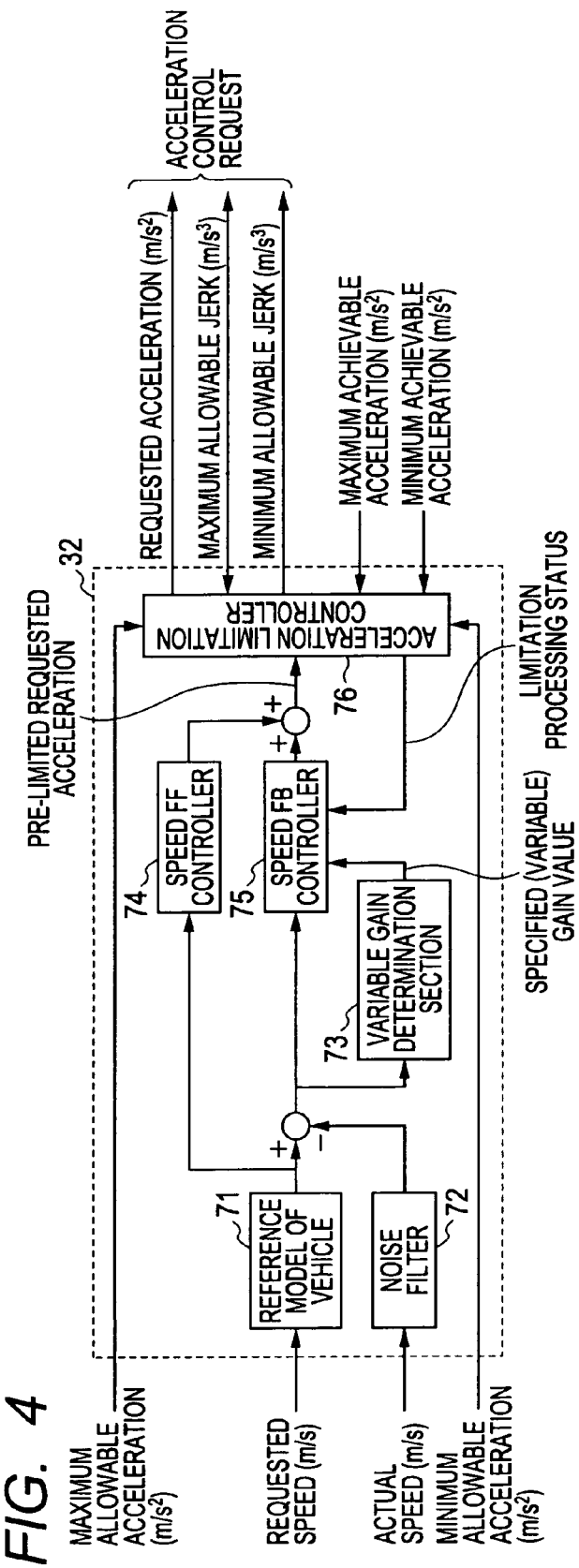
FIG. 4 is a block diagram for describing the internal operation of a speed control request conversion section of the embodiment.

As shown in FIG. 4, the successively selected speed control requests (each expressing a requested speed value, and upper and lower limit values of allowable speed) from the speed control request arbitration section 31 are transferred through a vehicle reference model 71. This has the effect of applying filtering to the requested speed values, with a filter characteristic having a similar frequency response characteristic to that of the acceleration control platform 40. Successive values of current speed of the vehicle (obtained from a sensor, not shown in the drawings) are transferred through a noise filter 72, which removes random noise. The speed control request conversion section 32 further includes a variable gain determination section 73. This is used to prevent failure of control convergence, which can occur if the differences between successive requested acceleration values are excessively narrow in relation to the acceleration control resolution (control period). This is achieved by applying a variable gain value as described in the following. The variable gain value varies in accordance with the difference between the currently requested speed value (as outputted from the reference vehicle model 71) and the actual vehicle speed (as outputted from the noise filter 72).

Figure 5:
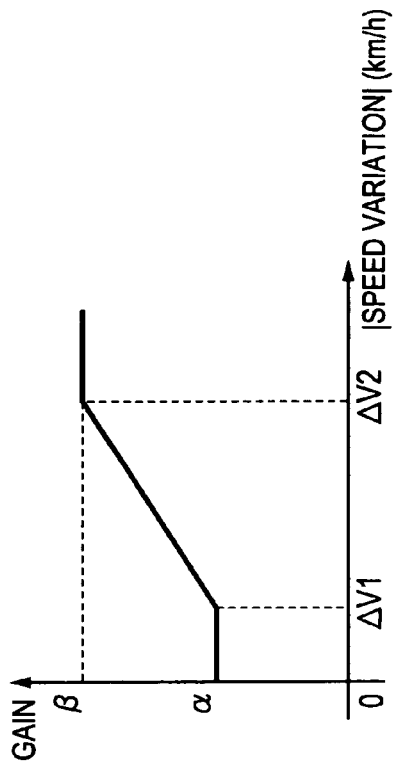
FIG. 5 is a graph illustrating a relationship between speed variation and gain, provided by a variable gain determining section in the speed control request conversion section.

As illustrated graphically in FIG. 5, when the speed difference does not exceed a threshold value $\Delta V1$, the variable gain is set at a low value, designated as α. If the speed difference exceeds a threshold value ΔV2, the variable gain is set at a higher value, designated as β. When the speed difference is within the range between ΔV1 and ΔV2, the variable gain is determined by linear interpolation between α and β.

A speed FF controller 74 multiplies the requested speed value (supplied from the reference vehicle model 71) by a proportional gain factor, and outputs the result as a FF (feedforward) requested acceleration value. A speed FB controller 75 multiplies the aforementioned difference between the requested speed (outputted from the reference vehicle model 71) and the actual speed (outputted from the noise filter 72) by the variable gain value that is currently determined by the variable gain determination section 73, and applies FB (feedback) control to the resultant value. With this embodiment, the FB control is implemented as PID (Proportional-Integral-Derivative) control. The result is outputted as a requested FB acceleration value.

However when the following two cases (1) or (2) occurs, exception processing is applied to the integration processing of the PID control, as described below.

(1) When a limitation processing status of an acceleration limitation controller 76 (described hereinafter) is ON (i.e., the status value is 1), integration processing is halted and the most recently obtained integration value is held constant. Thereafter, when the limitation processing status goes to OFF (i.e., the status value becomes 0), integration processing is resumed, using the most recently obtained integration value as an initial value.

(2) When the variable gain takes the value α, the integration processing is halted, and the integration value is set as zero. Subsequently, when the variable gain takes a value other than α, the integration processing is resumed, using zero as the initial integration value.

It should be noted that it would be possible to set the value of α as zero.

The acceleration limitation controller 76 receives the sum of the requested FB acceleration value and the requested FF acceleration value, that sum value being referred to herein as the pre-limited requested acceleration value. The acceleration limitation controller 76 also receives the maximum and minimum allowable acceleration values, and the maximum and minimum achievable acceleration values. The acceleration limitation controller 76 derives a requested acceleration value, by limiting the pre-limited requested acceleration value to be within the achievable acceleration range and within the allowable acceleration range. The acceleration limitation controller 76 also derives the aforementioned limitation processing status value and supplies this to the speed FB controller 75. With this embodiment, the limitation processing performed by the acceleration limitation controller 76 is based on following conditions:

(a) When:

pre-limited requested acceleration value<MAX(minimum allowable acceleration,minimum achievable acceleration)

then requested acceleration=MAX(minimum allowable acceleration,minimum achievable acceleration)

and, limitation processing status=ON.

(b) When:

MAX(minimum allowable acceleration,minimum achievable acceleration)≦pre-limited requested acceleration value≦MIN(maximum allowable acceleration,maximum achievable acceleration)

then, requested acceleration=pre-limited requested acceleration value and, limitation processing status=OFF.

(c) When:

pre-limited requested acceleration value>MIN(maximum allowable acceleration,maximum achievable acceleration)

then, limitation processing status=ON.

The requested acceleration value is thereby calculated, while the maximum allowable value of jerk, and the minimum allowable value of jerk are also calculated, based upon the condition of the vehicle interior and the vehicle occupants, etc. The requested acceleration value and the maximum and minimum allowable jerk values are then outputted to the acceleration control platform 40, as an acceleration control request.

Results Obtained

With the above embodiment, the vehicle motion control platform 10 constitutes a control request arbitration apparatus which arbitrates between a plurality of control requests from the control request apparatuses 51 to 55. Each of respective (position, speed or acceleration) control platforms of the vehicle motion control platform 10 contains:

(1) an arbitration section, which arbitrates between a plurality of inputted control requests, (2) a control request conversion section which converts a resultant selected control request to a succeeding control dimension (e.g., conversion from position to speed, position to acceleration, or speed to acceleration), and (3) an achievable control range conversion section which converts an inputted achievable control range to a range which is of an appropriate control dimension for use by the arbitration section and the control request conversion section of that specific position, speed or acceleration control platform.

The vehicle motion control platform 10 is thus provided with three control request conversion sections each of which integrally performs all control request conversion operations for a specific dimension (position, speed, or acceleration), and three "achievable range conversion sections", each of which integrally performs all achievable range conversion operations for a specific dimension (position, speed, or acceleration).

As a result, the total required number of these conversion sections can be held fixed, irrespective of the number of control request apparatuses which variously input position, speed and acceleration control requests to the control request arbitration apparatus. Design efficiency can thus be enhanced.

Figure 6:
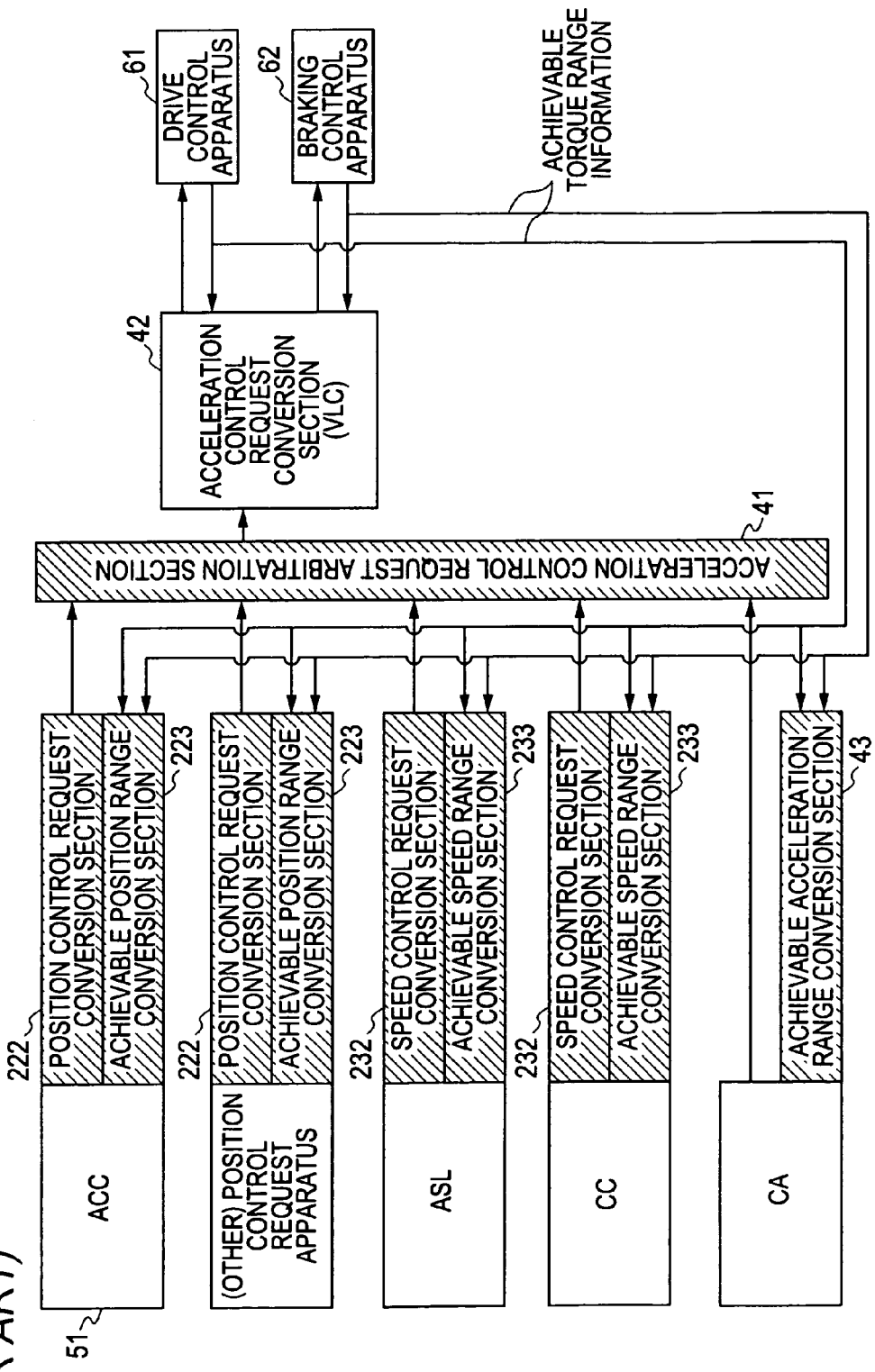
FIG. 6 is a block diagram showing the general configuration of an example of a prior art type of control platform.

The results will be described more specifically in the following, referring to the prior art example shown in FIG. 6. The total number of control request apparatuses having acceleration as the control objective will be designated as M, while the total number of non-acceleration control request apparatuses is designated as N.

In the prior art, acceleration control requests from all of the control request apparatuses are selected collectively, to obtain a single selected acceleration control request which is supplied to a VLC apparatus. In the example of FIG. 6, a single acceleration control request arbitration section 41 arbitrates a plurality of inputted acceleration control requests, supplied from control request apparatuses 51 to 55 (corresponding to the control request apparatuses 51 to 55 shown in FIG. 1 above). As shown, it is necessary to provide each of the non-acceleration control request apparatuses with a position control request conversion section 22 or a speed control request conversion section 32 (a total of N of these) and also with an achievable position range conversion section 23 and an achievable speed range conversion section 33 (total of N of these), and also provide each of the acceleration control request apparatuses with an achievable acceleration range conversion section 43 (total of M). Hence, including the acceleration control request arbitration section 41, it is necessary to provide a total of (2N+N+1) conversion sections.

However with the above embodiment, it is only necessary to provide the following sections (in addition to the acceleration control request conversion section 42). The position control request arbitration section 21, the position control request conversion section 22 and the achievable position range conversion section 23 which form the position control platform 20, the speed control request arbitration section 31, the speed control request conversion section 32 and the achievable speed range conversion section 33 which form the speed control platform 30, and the acceleration control request arbitration section 41 and achievable acceleration range conversion section 43 which form the acceleration control platform 40. Thus a total of 8 conversion sections are required.

This number is irrespective of the total number of control request apparatuses which variously input position, speed and acceleration control requests to the vehicle motion control platform 10.

Figure 7:
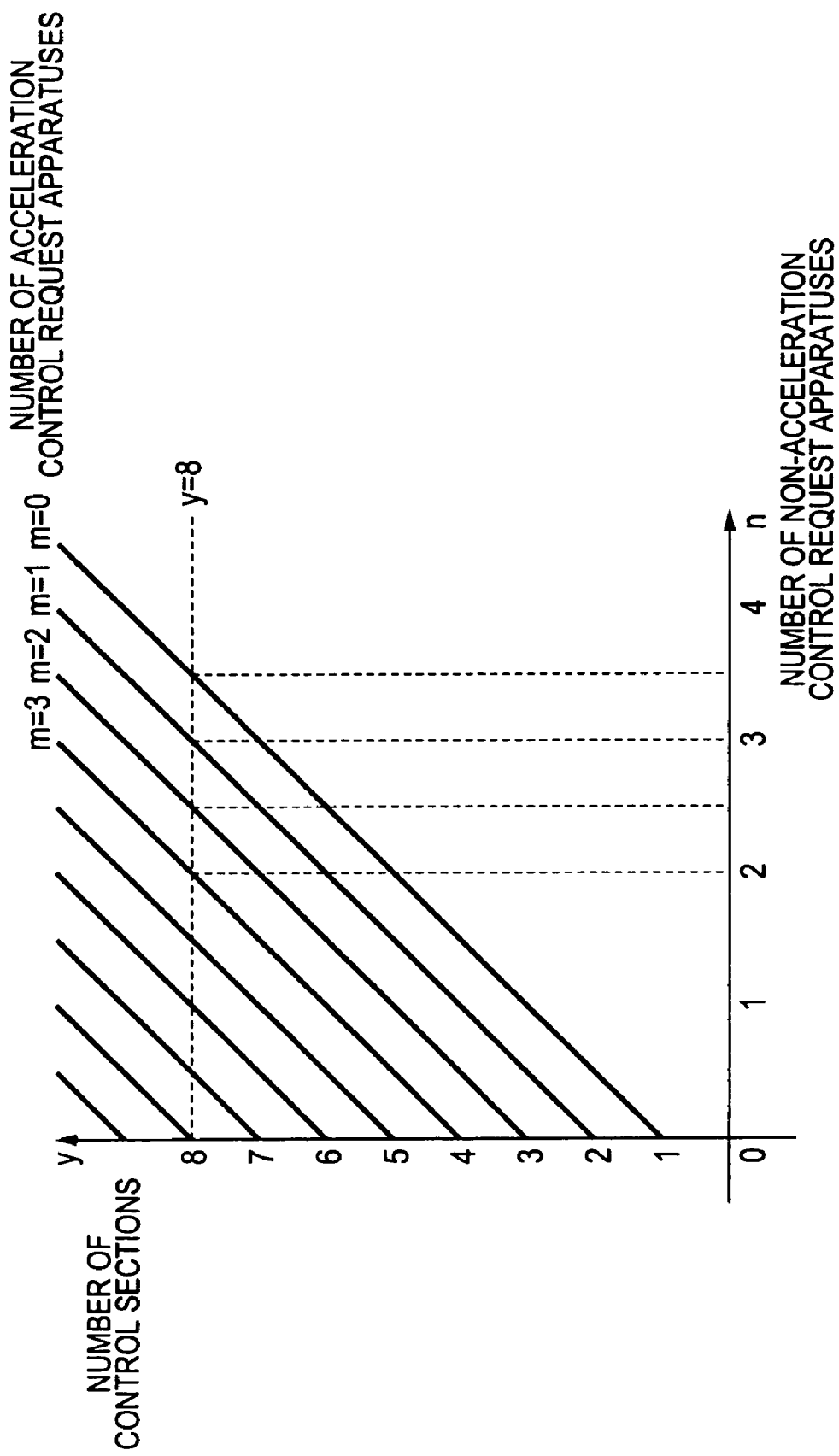
FIG. 7 is a diagram for use in comparing respective numbers of control sections required by the prior art example and by the embodiment.

Hence as illustrated in FIG. 7, if the aforementioned values M and N satisfy the condition [2N+M+1≧8], the total number of conversion sections required with the present invention does not exceed the number required in the prior art. For example if M=1, then if N=3, the number of conversion sections required with the present invention is identical to the number required in the prior art. As the value of N increases above 3, the number of conversion sections required with the present invention remains unchanged. Hence, the advantage of the present invention successively increases as the value of N becomes increasingly higher than 3, i.e., the greater the number of non-acceleration control request apparatuses, the greater will be the effect achieved by the present invention.

This is an important factor, since in recent years there has been a trend towards increasing the numbers of such control request apparatuses, due to the increasing numbers of different types of vehicle driver support apparatus which are coming into use. Hence, the number of control request apparatuses utilized in each vehicle can be expected to increase accordingly. Thus the present invention, as exemplified by the above embodiment, has substantial technological significance.

Furthermore with the above embodiment, when a plurality of control requests are inputted and these include one or more control requests which are outputted from control request apparatuses of a safety system of the vehicle, arbitration is performed which selects the one of the control requests that will result in the vehicle being brought most closely to a halted condition. It is thereby ensured that the arbitration between control requests cannot have an adverse effect upon safety.

Furthermore with above embodiment, when the absolute value of difference between a newly selected requested control value and a precedingly selected control value is judged to exceed a predetermined threshold, smoothing processing is initiated, to achieve a gradual transition to the newly selected control value. In that way it is ensured that implementing the control requests cannot produce large-scale abrupt changes in the requested motion control (e.g., requested braking torque or drive torque value).

Although the above embodiment has been described assuming that the functions of the vehicle motion control platform 10 are implemented by a computer in executing a program or a plurality of programs, it will be understood that it would be equally possible to implement at least a part of these functions by hardware circuitry.

Alternative Embodiments

It should be noted that the present invention is not limited to the embodiment described above, and that various alternative embodiments or modifications of the above embodiment may be envisaged, which fall within the scope claimed for the invention.

For example, with the above embodiment, the vehicle motion control platform 10 includes an achievable position range conversion section 23, an achievable speed range conversion section 33 and an achievable acceleration range conversion section 43. However it would be possible to configure an alternative embodiment, in which these are omitted. In that case, designating the number of acceleration control request apparatuses as M and the number of non-acceleration control request apparatuses as N, then in the case of the prior art in which acceleration control requests are generated directly by each of the control request apparatuses (as in the example of FIG. 6) and are collectively selected, it is necessary to provide a total of N+1 control modules. However with the latter alternative embodiment, it would only be necessary to provide a total of 5 control modules (arbitration modules 21, 31, 41 and conversion modules 22, 32), irrespective of the number (M+N) of control request apparatuses. Hence, if N≧4, the number of control modules required with the present invention would not exceed the number required in the prior art, while the greater the amount by which N exceeds 4, the greater would be the advantage provided by the present invention.

With the first embodiment, arbitration is performed by selecting a single control request from an inputted plurality of control requests. However the invention is not limited to this, and it would be equally possible for example to perform arbitration by obtaining the average of respective requested values conveyed by a plurality of control requests.

Figure 8:
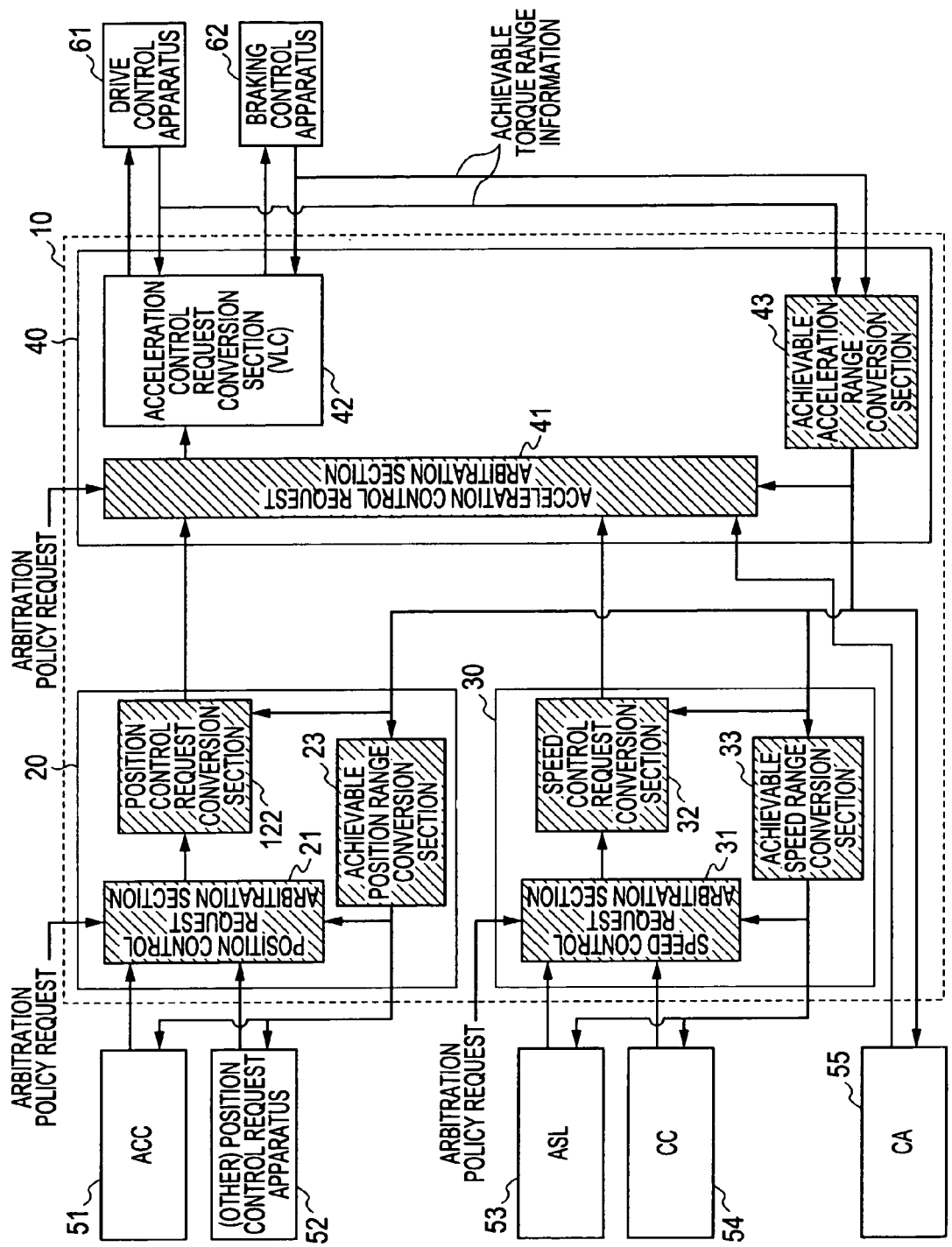
FIG. 8 is a block diagram showing the general configuration of an alternative embodiment of a control platform.

Moreover as illustrated in the block diagram of FIG. 8, it would be possible to configure a second alternative embodiment. In this embodiment, a position control request conversion section 122 of a position control platform 20 directly converts a selected position control request to an acceleration control request. In addition, an achievable position range conversion section 123 directly converts achievable maximum and minimum acceleration values to achievable maximum and minimum position values. Respective acceleration control requests that are outputted from the position control platform 20, the speed control platform 30 and the CA apparatus 55 are inputted in parallel to the acceleration control platform 40. In other respects, the operation and effects of this embodiment are similar to those of the first embodiment above.

In addition, it would be possible to modify the second alternative embodiment shown in FIG. 8, by omitting the achievable acceleration range conversion section 43, the achievable speed range conversion section 33 and the achievable position range conversion section 123.

The embodiments described above serve for controlling longitudinal motion of a vehicle. However the invention is not limited to this, and would be equally applicable to an apparatus for controlling lateral motion of a vehicle (i.e., based on control requests specifying requested lateral values of position, speed and acceleration). Similarly, the invention would be equally applicable to an apparatus for controlling vertical motion of a vehicle, with similar advantages to those described for the above embodiments being obtainable.

Furthermore it will be understood that the vehicle position information may consist of relative position information, i.e., expressing a separation distance of the host vehicle from a preceding vehicle.

What is claimed is:

1. A control request arbitration apparatus, disposed in a vehicle equipped with an acceleration control apparatus for controlling acceleration of the vehicle by variation of an acceleration control quantity, and equipped with a plurality of control request apparatuses variously generating position control requests expressing respective requested vehicle position values, speed control requests expressing respective requested vehicle speed values and acceleration control requests expressing respective requested vehicle acceleration values;
    wherein the control request arbitration apparatus comprises:
    a position control request section configured for receiving a plurality of the position control requests and for selecting one of the received position control requests in accordance with predetermined criteria;
    a position control request conversion section configured for converting the selected position control request to a first converted control request, the first converted control request being determined as one of a speed control request and an acceleration control request in accordance with a destination thereof;
    a speed control request arbitration section configured for receiving a plurality of speed control requests and for selecting one of the received speed control requests in accordance with predetermined criteria,
    a speed control request conversion section configured for converting the selected speed control request to a second converted control request, the second converted control request being determined as one of a position control request and an acceleration control request in accordance with a destination thereof;
    an acceleration control request arbitration section configured for receiving a plurality of acceleration control requests and for selecting one of the received acceleration control requests in accordance with predetermined criteria; and
    an acceleration control request conversion section configured for converting the selected acceleration control request to a motion control request expressing a requested value of the acceleration control quantity.

2. A control request arbitration apparatus according to claim 1, wherein
    the position control request arbitration section receives a plurality of position control requests from respective ones of the control request apparatuses,
    the first converted control request is produced by the position control request conversion section as a speed control request and is inputted to the speed control request arbitration section together with at least one speed control request produced by a control request apparatuses, and
    the second converted control request is produced by the speed control request conversion section as an acceleration control request and is inputted to the acceleration control request arbitration section together with at least one acceleration control request produced by a control request apparatus.

3. A control request arbitration apparatus according to claim 1, wherein
    the position control request arbitration section receives a plurality of position control requests from respective ones of the control request apparatuses,
    the first converted control request is produced by the position control request conversion section as an acceleration control request,
    the speed control request arbitration section receives a plurality of speed control requests from respective ones of the control request apparatuses,
    the second converted control request is produced by the speed control request conversion section as an acceleration control request, and
    the acceleration control requests produced by the position control request conversion section and by the speed control request conversion section are inputted to the acceleration control request arbitration section together with at least one acceleration control request produced by a control request apparatus.

4. A control request arbitration apparatus according to claim 1, wherein the acceleration control quantity comprises an amount of torque applied to wheel axles of the vehicle, and wherein the motion control request expresses one of a requested drive torque value and a requested braking torque value.

5. A control request arbitration apparatus according to claim 1, wherein
    the acceleration control apparatus produces achievable motion control range information indicative of a range of achievable values of the acceleration control quantity, and
    at least one of the position control request arbitration section, the speed control request arbitration section and the acceleration control request arbitration section, is configured to limit a control value expressed by a currently selected control request, for maintaining the requested value of the acceleration control quantity to be within the achievable range of values of the acceleration control quantity.

6. A control request arbitration apparatus according to claim 5, comprising
    an acceleration range conversion section configured for converting the achievable motion control range information to achievable acceleration range information expressing a currently achievable range of acceleration of the vehicle,
    a speed range conversion section configured for converting the achievable acceleration range information to achievable speed range information expressing a currently achievable range of speed of the vehicle, and a position range conversion section configured for converting the achievable speed range information to achievable position range information expressing a currently achievable range of positions of the vehicle;

wherein the position control request arbitration section is configured to be responsive to the achievable position range information for limiting a requested position, expressed by the selected position control request, to be within the currently achievable range of positions, the speed control request arbitration section is configured to be responsive to the achievable speed range information for limiting a requested speed, expressed by the selected speed control request, to be within the currently achievable range of speeds, and the acceleration control request arbitration section is configured to be responsive to the achievable acceleration range information for limiting a requested acceleration, expressed by the selected position control request, to be within the currently achievable acceleration range.

7. A control request arbitration apparatus according to claim 6, wherein the acceleration control quantity is an amount of torque applied to wheel axles of the vehicle, and wherein the achievable motion control range information expresses an achievable range of values of wheel axle torque.

8. A control request arbitration apparatus according to claim 7, wherein at each of successive control timings, the acceleration control apparatus generates updated achievable torque range information expressing a range of values of wheel axle torque that can be applied during a succeeding control period extending to a succeeding control timing, the acceleration range conversion section is configured to derive updated achievable acceleration range information corresponding to the updated achievable torque range information at each control timing, as a maximum achievable value of acceleration and a minimum achievable value of acceleration that can be respectively attained during the succeeding control period by applying the maximum achievable value of wheel axle torque and the minimum achievable value of wheel axle torque respectively during the control period, the speed range conversion section is configured to derive updated achievable speed range information corresponding to the updated achievable acceleration range information at each control timing, as a maximum achievable value of speed and a minimum achievable value of speed that can be respectively attained in the succeeding control period by applying the maximum achievable value of acceleration and the minimum achievable value of acceleration respectively during the control period, and the position range conversion section is configured to derive updated achievable position range information corresponding to the updated achievable speed range information at each control timing, comprising a maximum achievable position, obtained as a current position of the vehicle incremented by a displacement amount corresponding to applying the maximum achievable speed throughout the succeeding control period, and a minimum achievable position, obtained as the current position of the vehicle incremented by a displacement amount corresponding to applying the minimum achievable speed during the succeeding control period.

9. A control request arbitration apparatus according to claim 1, wherein the plurality of control requests comprise more than four control requests each of which is a speed control request or a position control request.

10. A control request arbitration apparatus according to claim 1, wherein each of the position control request arbitration section, the speed control request arbitration section and the acceleration control request arbitration section is configured to distinguish a control request having a predetermined character, and to perform the arbitration by assigning a higher priority to the control request having the predetermined character than to other ones of a plurality of control requests.

11. A control request arbitration apparatus according to claim 1, wherein the control request having a predetermined character comprises a control request whose implementation would result in the vehicle being brought closer to a halted condition than would implementation of any other of the plurality of control requests.

12. A control request arbitration apparatus according to claim 1, wherein the selection of a position control request, of a speed control request and of a selected acceleration control request are each performed at fixed periodic intervals, and each of the position control request arbitration section, the speed control request arbitration section and the acceleration control request arbitration section is configured to detect a condition whereby a difference between a requested control value expressed by a currently selected control request and a requested control value expressed by a precedingly selected control request exceeds a predetermined threshold, and to initiate predetermined smoothing processing when the condition is detected;

the smoothing processing being applied to adjust respective control values expressed by successively selected control requests, in a manner for effecting a gradual variation of the control values expressed by the successively selected control values.

13. A control request arbitration apparatus, disposed in a vehicle equipped with an acceleration control apparatus and a plurality of control request apparatuses, the control request arbitration apparatus being configured for supplying a torque control request expressing a requested value of torque to the acceleration control apparatus, the torque control request being derived based upon position control requests expressing respective requested vehicle position values, speed control requests expressing respective requested vehicle speed values and acceleration control requests expressing respective requested vehicle acceleration values, variously generated by the control request apparatuses;

wherein the control request arbitration apparatus comprises:

a position control request arbitration section configured for selecting a position control request from a plurality of the position control requests in accordance with predetermined criteria, a position control request conversion section configured for converting the selected position control request to a speed control request, a speed control request arbitration section configured for receiving the speed control request derived by the position control request conversion section and at least one speed control request generated by a control request apparatus, and for selecting a speed control request from the received speed control requests in accordance with predetermined criteria, a speed control request conversion section configured for converting the selected speed control request to a converted acceleration control request, an acceleration control request arbitration section configured for receiving the converted acceleration control request and at least one acceleration control request generated by a control request apparatus, and for selecting an acceleration control request from the received acceleration control requests in accordance with predetermined criteria, and an acceleration control request conversion section configured for converting the selected acceleration control request to the torque control request, and supplying the torque control request to the acceleration control apparatus.

14. A control request arbitration apparatus according to claim 13, wherein each of the position control requests further expresses an allowable range of speed, and the position control request conversion section is configured to convert a requested position value expressed by the selected position control request to a requested speed value that is within the allowable range of speed expressed by the selected position control request, and each of the speed control requests further expresses an allowable range of acceleration, and the speed control request conversion section is configured to convert a requested speed value expressed by the selected speed control request to a requested acceleration value that is within the allowable range of acceleration expressed by the selected speed control request.

15. A control request arbitration apparatus according to claim 13, wherein the torque control request expresses one of a requested value of drive torque and a requested value of braking torque.

16. A control request arbitration apparatus according to claim 13, wherein the acceleration control apparatus produces information indicative of a currently achievable range of values of torque, and at least one of the position control request arbitration section, the speed control request arbitration section and the acceleration control request arbitration section is configured to limit a control value expressed by a control request value produced thereby, for maintaining the requested value of torque within the currently achievable range of torque.

17. A control request arbitration apparatus disposed in a vehicle equipped with an acceleration control apparatus and a plurality of control request apparatuses, the control request arbitration apparatus being configured for supplying a torque control request to the acceleration control apparatus based upon position control requests expressing respective requested vehicle position values, speed control requests expressing respective requested vehicle speed values and acceleration control requests expressing respective requested vehicle acceleration values, variously generated by the control request apparatuses;

wherein the control request arbitration apparatus comprises:

a position control request arbitration section configured to derive a selected position control request from a plurality of the position control requests, a position control request conversion section configured for converting the selected position control request to a first converted acceleration control request, a speed control request arbitration section configured to select a speed control request from a plurality of the speed control requests, a speed control request conversion section configured for converting the selected speed control request to a second converted acceleration control request, an acceleration control request arbitration section configured for arbitrating the first converted acceleration control request, the second converted acceleration control request and at least one acceleration control request generated by a control request apparatus, to obtain a selected acceleration control request, and an acceleration control request conversion section configured for converting the selected acceleration control request to the torque control request and supplying the torque control request to the acceleration control apparatus.

18. A control request arbitration apparatus according to claim 17, wherein the torque control request expresses one of a requested value of drive torque and a requested value of braking torque.

19. A control request arbitration apparatus according to claim 1, wherein control requests are outputted to the acceleration control apparatus only from the acceleration control request conversion section.

* * * * *